United States Patent

[11] 3,601,583

[72] Inventor  Yasuharu Fujiwara
               Kanagawa-ken, Japan
[21] Appl. No. 815,435
[22] Filed     Apr. 11, 1969
[45] Patented  Aug. 24, 1971
[73] Assignee  Nippon Sheet Glass Co. Ltd.
               Osaka, Japan

[54] ELECTRICAL HEATING WIRE ASSEMBLY FOR INCORPORATION IN WIRED LAMINATED GLASS PANELS
3 Claims, 7 Drawing Figs.

[52] U.S. Cl. .................................................. 219/522, 219/544
[51] Int. Cl. ................................................... H05b 3/06
[50] Field of Search ....................................... 219/522, 202–203, 543, 544, 528, 549; 29/611; 338/308–309, 212

[56] References Cited
UNITED STATES PATENTS

| | | | |
|---|---|---|---|
| 2,650,976 | 9/1953 | Gaiser et al. | 219/522 |
| 3,020,376 | 2/1962 | Hofmann et al. | 219/203 X |
| 3,223,829 | 12/1965 | Davy et al. | 219/522 |
| 3,409,759 | 5/1968 | Boicey et al. | 219/522 |
| 3,378,919 | 4/1968 | Brittan | 29/611 |
| 3,414,713 | 12/1968 | Reifeiss et al. | 219/522 |
| 3,440,408 | 4/1969 | Brittan | 219/522 |

*Primary Examiner*—Volodymyr Mayewsky
*Attorney*—Waters, Roditi, Schwartz & Nissen ABSTRACT: An electrical heating wire assembly for incorporation in a wired laminated glass panel, comprising an array of closely spaced parallel electric heating wires sandwiched between two sheets of films which are not adhesive to the cement to be used for bonding a pair of glass sheets forming said laminated glass panel one and at least one of the firms of which has said cement coated on the inside face thereof to secure the individual electrical heating wires in positions integrally therewith, said electrical heating wire assembly being used in such a manner that after removing the two sheets of films, the array of electrical heating wires carried by the cement layer is positioned on the inside face of one of said pair of glass sheet and the other one of the glass sheets is positioned on said array of electrical heating wires with the same cement interposed therebetween, whereby the two glass sheets are bonded together with the array of heating wires incorporated therein.

ELECTRICAL HEATING WIRE ASSEMBLY FOR INCORPORATION IN WIRED LAMINATED GLASS PANELS

BACKGROUND OF THE INVENTION

1. FIELD OF THE INVENTION

The present invention relates to an electrical heating wire assembly suitable for incorporation in wired laminated glass panels.

2. DESCRIPTION OF THE PRIOR ART

In a motor vehicle, the vision of the driver through the windshield is often interfered with by a fog formed on the face of the windshield due to a temperature difference between the outside and inside of the windshield or by snow or ice attached to the outer face of the windshield. In order to avoid such undesirable phenomenon, a laminated glass panel incorporating electrical heating wires has been used. Namely, when electric current is conducted through the heating wires, both the inboard and the outboard of the panel are heated by the heat generated in the heating wires, whereby the fog, snow or ice attached on the face of the panel is cleared and the vision of the driver is secured.

In the production of such a wired laminated glass panel as described above, there has been used a sheet material as an interlayer which comprises two sheets of thermoplastic material, such as polyvinyl butyral, (each normally being in a thickness of the order of 0.38 mm.) with an array of electrical heating wires securely fixed therebetween, or a sheet material which comprises a single sheet of thermoplastic material having an array of electrical heating wires embedded in the surface layer thereof. Namely, two sheet materials forming the layers of laminated glass panel are laminated together with either one of these interlayer sheets of thermoplastic material interposed therebetween, which serve as securing members for the electrical heating wires and simultaneously as cement for bonding the two layers of sheet materials with each other.

However, since the sheets of polyvinyl butyral are relatively large in thickness, the interlayer of the type described above has suffered from the disadvantage that the electrical heating wires become loose due to the contraction of the resin material after incorporation of said wires, due to the differences in physical property between the resin and the heating wires, with the accompanying result that the arrangement of the heating wires is rendered disorderly and the linearity of the individual heating wires cannot be maintained.

In addition, in laminating the layers of glass sheets together with the two interlayer sheets of thermoplastic material interposed therebetween, to form a laminated glass panel, a pair of feed conductors must be connected to the end portions of the heating wires by soldering, welding or other suitable method and for this purpose a part of the interlayer sheets must be removed to expose the heating wires. In this case, however, it is very difficult to perform the work without causing disarrangement of the heating wires. Namely, with the conventional interlayer sheet material the operation of maintaining the array of heating wires before connecting said heating wires to the feed conductors is extremely cumbersome.

On some occasion, it is desirable to provide an array of heating wires only at that portion of a windshield through which the driver sees. In this case, it has been experienced that a distortion of image is caused at that portion of the interlayer sheet where the portion of the sheet incorporating the heating wires is joined with the portion where such heating wires are not present (that is, the portion indicated by numeral 10 in FIG. 6) and such a distortion is promoted when the thickness of the interlayer sheet is large.

These types of laminated glass panels as described above have been manufactured by a method which comprises the steps of laying a suitable size of a sheet of thermoplastic material on the surface of one of the glass sheets constituting the laminated glass panel, placing a heating wire grid work on said interlayer sheet, laying a further interlayer sheet of thermoplastic material or spraying a solution of a material of which said interlayer sheet is made over said heating wire grid work, laying the other one of said glass sheets on said further interlayer sheet or said layer of thermoplastic resin solution and then integrating all of said layers by a known method. According to an alternative method, the heating wire grid work is placed on the surface of one of the laminated panel-forming glass sheets and after spraying a solution of thermoplastic resin, the other glass sheet is placed over said wire grid work resin, and laminated together with said first glass sheet.

In any one of the conventional methods described above, the operation of laminating a pair of glass sheets involves the steps of disposing an adhesive layer or layers and a heating wire grid work between said glass sheets in a predetermined manner, and a method has not been employed in which the heating wire grid work is previously interposed between two interlayer sheets acting as cement layers or bonded to one of such interlayer sheets to form a unitary interlayer member and laminating a pair of glass sheets with such a unitary interlayer member intervening therebetween.

Further, according to the conventional methods failure is not tolerated in the manufacture of a laminated glass panel since the polyvinyl butyral used is quite expensive.

SUMMARY OF THE INVENTION

The present invention has been achieved obviating the foregoing disadvantages. Namely, according to the present invention, there is provided a unitary heating wire assembly suitable for incorporation in laminated glass panels, wherein an array of electrical heating wires is arranged in closely spaced parallel relationship between two sheets of film of a material which does not securely adhere to cement used for bonding the glass sheets with each other, and securely held in its form by means of cement integral therewith, which cement is of the same composition as that mentioned above and which is coated on the inside face of at least one of said sheets of film. Polyvinyl butyral is a typical example of the cement used for laminating the glass sheets together but any other suitable cement may be used, provided that the cement used is capable of bonding the glass sheets together and also capable of retaining the array of heating wires in its form after said array of heating wires has been attached to said resin cement. As a material of the film which does not securely adhere said cement, reference is made, for example, to polyethylene synthetic resin, but again any other material may be used for the film as long as the film is capable of holding the polyvinyl butyral resin from both sides over an extended period to enable said resin to retain the array of heating wires in its form and is readily removable from said resin when the array of heating wires is to be used. The heating wires which generate heat upon application of electric current therethrough, may be made of a nickel and chromium alloy or cupro-nickel, but the wires are preferably made of tungsten (the diameter of said wires being selected in the range from 0.01 to 0.03 mm.).

According to the present invention, there is also provided a method of manufacturing a wired laminated glass panel using the electrical heating wire assembly of the type described above, said method comprising the steps of coating cement of the nature described above on one face of a film which does not securely adhere said cement, drying the coated cement, arranging a plurality of electric heating wires on the coated face of said film in suitably spaced parallel relationship, whereby said array of electrical heating wires is fixed in its form by a layer of said cement coating, delaminating said layer of cement coating from said film with said array of heating wires fixed thereto, placing said layer of cement coating on the surface of one of a pair of glass sheets forming the laminated glass panel to be bonded thereto, placing the other one of said glass sheets on said layer of cement coating with a layer of the same or equivalent cement intervening therebetween and then bonding said glass sheets together by suitable means known in the art.

These and other objects, features and advantages of the present invention will be apparent from the following description taken in conjunction with the accompanying drawings. However, it should be understood that the present invention is not restricted only to the embodiment illustrated in the drawings and many changes and modifications are possible without deviating from the spirit and scope of the invention set forth in the appended claim.

DESCRIPTION OF THE PREFERRED EMBODIMENTS

Figure 1:
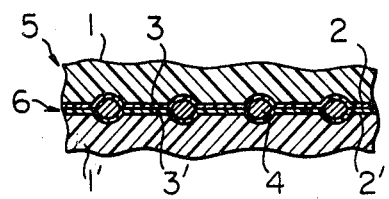
FIG. 1 is a fragmentary vertical sectional view of one form of the heating wire assembly according to the present invention, in which an array of electrical heating wires disposed between a pair of films is integrated with two interlayers of cement material formed on both sides of said array of heating wires.

Referring now to FIG. 1, there is shown one form of the heating wire assembly 6 according to the present invention, which comprises a large number of straight or waved electrical heating wires 4 arranged in suitably spaced parallel relationship and each having a diameter of 10 to 30 microns, said wires being integrally sandwiched between a pair of thin layers 3, 3' of polyvinyl butyral. The heating wire assembly 6 of the structure described above is sandwiched between a pair of polyethylene films 1, 1' which do not produce a permanent bond between them and the respective layers 3, 3' of polyvinyl butyral which is used for bonding a pair of glass sheets to form a laminated glass panel incorporating said heating wire assembly 6 as an interlayer thereof.

The heating wire assembly 6 of the type described above can be produced by coating a solution of polyvinyl butyral in a solvent, such as methanol, on the confronting faces 2, 2' of the polyethylene films 1, 1' and drying the same to form the layers 3, 3' of said resin on the respective faces in a thickness of about 5 microns, forming the array of heating wires 4 on one of said resin layers 3, 3', laying the other one of the polyethylene films 1, 1' on said array of heating wires in such a manner that said array of heating wires is sandwiched between said resin layers 3, 3' and thereafter passing the laminate thus obtained through a pair of press rolls, whereby said respective layers 3, 3' are integrated in a unitary laminate or an intermediate member generally indicated by numeral 5.

Figure 3:
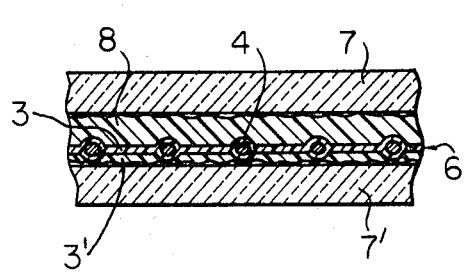
FIGS. 3 to 5 inclusive are fragmentary vertical sectional views respectively showing the structures of various laminated glass panels manufactured by using the heating wire assembly of this invention.

In use of the heating wire assembly thus produced, one of the polyethylene films 1' is delaminated from the laminate 5 and the remainder is placed on one of a pair of glass sheets 7, 7', which are to be bonded together to form a laminated glass panel, in such a manner that the exposed face of the heating wire assembly 6 is in contact with said glass sheet 7', as shown in FIG. 3. Then, the other polyethylene film 1 is delaminated, whereby the heating wire assembly 6 only remains on the glass sheet 7'. An interlayer 8 of polyvinyl butyral is formed on the now exposed face of the heating wire assembly 6 and thereafter the other one of the glass sheets 7 is superposed on said interlayer 8, whereby a laminate of sandwich structure is obtained. This laminate is then processed through a laminating machine of the type normally used in the art for the manufacture of laminated glass panels, whereby both of said glass sheets are bonded with each other with the heating wire assembly interposed therebetween and thus a unitary wired laminated glass panel is obtained.

Figure 4:
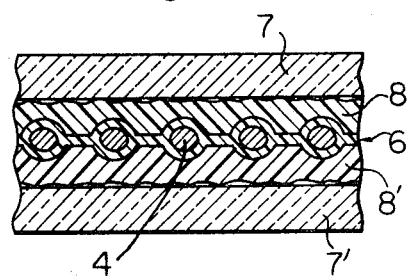
Figure 5:
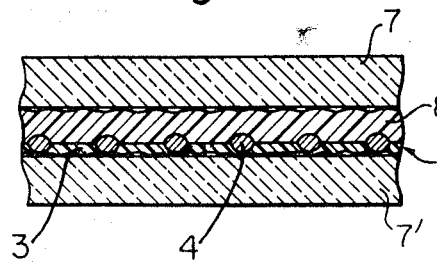

The laminated glass panel shown in FIG. 4 is also manufactured in the same manner as described above, using the heating wire assembly of FIG. 1, but in this case, the interlayers 8, 8' of polyvinyl butyral are formed on both sides of the heating wire assembly 6 to bond the glass sheets 7, 7' together.

Figure 2:
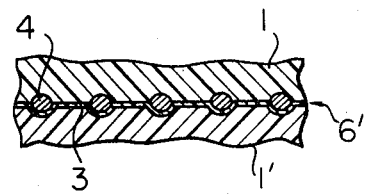
FIG. 2 is a fragmentary vertical sectional view, similar to FIG. 1, showing another form of the heating wire assembly of this invention, in which an array of electrical heating wires is integrated with a single interlayer of cement material.

Another form of the heating wire assembly according to the present invention is shown in FIG. 2. This heating wire assembly, generally indicated by numeral 6', comprises an array of heating wires 4 and a thin layer 3 of polyvinyl butyral provided on one side of said heating wires integrally therewith. Such heating wire assembly 6' can be obtained by coating the aforesaid solution of polyvinyl butyral on a surface of one of the polyethylene films 1' to form the polyvinyl butyral resin layer 3 and then the array of heating wires 4 is formed on the exposed face of said resin layer 3 and further the other polyethylene film 1 is superposed on said array of heating wires 4. Thereafter, the entire laminate is passed through a pair of press rolls, as in the preceding embodiment, and thereby the array of heating wires is securely fixed to the polyvinyl butyral coating layer 3 to be retained thereby. In use of this form of the heating wire assembly, the resin coating layer 3 is placed on one of a pair of glass sheets 7', 7' which are to be laminated to form a laminated glass panel, and a coating layer 8 of the same resin material is formed on the exposed face of the heating wire assembly. Thereafter, the other one of the glass sheets, sheet 7, is placed on said resin coating layer 8 and the resultant laminate assembly is processed through a laminating machine, like before, whereby a unitary laminated glass panel is obtained incorporating the heating wires in a sandwich structure.

In the heating wire assembly according to the present invention, the resin coating layer located on one or both sides of the array of heating wires is as thin as about 5 microns. Therefore, when a pair of feed conductors are placed one on each side of the heating wire assembly so as to clamp said assembly and one of the feed conductors is heated by a soldering iron rubbing thereover, both of the feed conductors can readily be connected with the heating wires and with each other without being interfered with by the presence of the coating layer or layers, and a good electrical contact is produced between the heating wires and the feed conductors so as to make the latter electric terminals.

The heating wire assembly of the present invention can also be advantageously used where incorporation of heating wires is desired only at a portion of a laminated glass panel, owing to the fact that the overall thickness of the heating wire assembly is extremely small.

Figure 6:
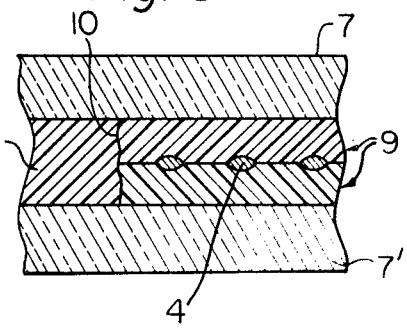
FIG. 6 is a fragmentary vertical sectional view of a conventional laminated glass panel incorporating an array of heating wires only at a portion thereof.

Namely, in a conventional laminated glass panel of this type, as shown in FIG. 6, an interlayer generally indicated by numeral 9 securely fixing the heating wires therein and an interlayer 8 having a thickness substantially equal to the overall thickness of the interlayer 9 and including no heating wires are disposed in side by side relation. Because of such structure, extreme care is required for the prevention of an optical distortion or a distortion of perspective image which is possibly caused at the junction 10 between the interlayers 8 and 9.

Figure 7:
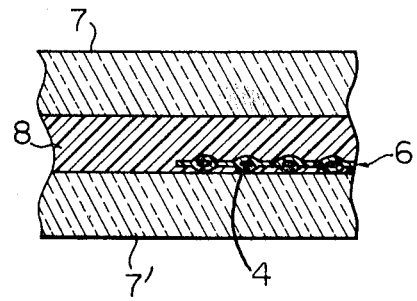
FIG. 7 is a fragmentary vertical sectional view of a laminated glass panel manufactured by the method of this invention and incorporating an array of heating wires only at a portion thereof, like that shown in FIG. 6.

However, in the present invention, the very thin or small heating wire assembly 6 is disposed on a portion of one of glass sheets i.e. sheet 7' and the resin coating 8 constituting the interlayer of the laminated glass panel can be formed continuously over the interspace between the pair of glass sheets 7, 7' including the portion having the wire assembly disposed thereon as shown in FIG. 7 and, in addition, the thickness of the interlayer 8 is as large as several tens times that of the heating wire assembly 6 or, in other words, the thickness of the heating wire assembly is substantially negligible with respect to the thickness of the interlayer 8. Therefore, the laminated glass panel according to the invention is totally free of optical distortion.

Another advantage of the heating wire assembly of the instant invention is that if it becomes necessary, for some reason, to discard the heating wire assembly during the process of manufacturing a laminated glass panel, the amount of the polyvinyl butyral resin to be wasted is far smaller than in case of the conventional interlayer, as may be obvious from the fact that while the thickness of the conventional interlayer of resin material is 380 microns, that of the resin layer formed on one or both sides of the array of heating wires is only about 5 microns. It is also important to note that, while the conventional interlayer 9 of resin material has been used for bonding a pair of glass sheets forming a laminated glass panel per se, the resin layers of the present heating wire assembly, constituting the interlayer of a laminated glass panel, have for their primary object the provision of a reliable means for fixing of the array of heating wires and their functions of bonding the laminated panel-forming glass sheets are shared by the interlayers 8, 8'.

The heating wire assembly according to the invention has a long storage capacitor for as long as it is held between the films 1, 1', and can readily be offered for service simply by delaminating said films. Furthermore, since in the present heating wire assembly the heating wires are fixed on one side of an extremely thin resin layer or between a pair of such resin layers and the heating wire assembly is held between a pair of films during storage, the resin layer or layers would be subjected to less contractive force as compared with the conventional assembly, if any, during storage and accordingly no unreasonable stress would occur between said resin layer or layers and the heating wires, thus preventing loosening of the heating wires.

Still further, according to the present invention the heating wire assembly can be produced immediately for prompt use, by coating polyvinyl butyral on one face of the film and fixing an array of heating wires on said resin coating layer. In this case, there is obviously no need of using another film.

What is claimed is:

1. A heating wire assembly for incorporation in a laminated glass panel, said assembly comprising an array of electrical heating wires to be connected between a pair of spaced electrical terminal means and arranged in suitably spaced parallel relationship and a thin layer of transparent, electrically insulative cement material disposed at least on one side of said array of electrical heating wires integrally therewith for securely fixing said array of electrical heating wires in position, said thin layer being thin relative to the diameter of said heating wires said thin layer of cement being constituted of substantially the same cement material as that to be used for laminating a pair of glass sheets forming the laminated glass panel, said thin layer of cement being disposed on at least one of the confronting faces of a pair of films which are not permanently adhesive to said cement material and between which said heating wire assembly is sandwiched, said cement material being polyvinyl butyral.

2. A heating wire assembly as defined in claim 1, in which said pair of films are polyethylene films.

3. A heating wire assembly as defined in claim 1, in which said thin layer has a thickness of about 5 microns.